Feb. 11, 1941.  B. HELLER ET AL  2,231,670
GRID CONTROL SYSTEM
Filed July 9, 1938  2 Sheets-Sheet 1

WITNESSES:
C. J. Weller.
Hymen Diamond.

INVENTORS
Bedrich Heller and
Jaroslav Ibl.
BY
F. W. Lyle.
ATTORNEY

Feb. 11, 1941.  B. HELLER ET AL  2,231,670
GRID CONTROL SYSTEM
Filed July 9, 1938  2 Sheets-Sheet 2

WITNESSES:
C. J. Weller.
Hymen Diamond.

INVENTORS
Bedrich Heller and
Jaroslav Ibl.
BY
F. W. Lyle
ATTORNEY

Patented Feb. 11, 1941

2,231,670

UNITED STATES PATENT OFFICE 2,231,670

GRID CONTROL SYSTEM

Bedrich Heller and Jaroslav Ibl, Prague, Czechoslovakia, assignors to Westinghouse Electric & Manufacturing Company, East Pittsburgh, Pa., a corporation of Pennsylvania Application July 9, 1938, Serial No. 218,472
In Czechoslovakia July 20, 1937

8 Claims. (Cl. 250—27)

It is known that the moment of ignition of an anode of a mercury arc rectifier or other arc device can be controlled by the use of a grid located in the path of the arc if suitable voltage is supplied to it. Several contrivances for producing a voltage of suitable wave form and controllable phase position for the control of grids are known. Electro-mechanic rotating contact devices or stationary electric or electromagnetic devices, as for example, an induction regulator which changes the phase position of the grid voltage with reference to the anode voltage, have been used. Highly saturated transformers have also been used for obtaining grid voltage of proper wave form.

In the systems that incorporate the highly saturated transformers, the grid voltage is taken directly from the transformer. To precent distortion of the voltage wave form required for the grid control by the action of the grid current, that current has to be just a small fraction of the magnetizing current of the saturated transformer. Therefore, the transformers must have very liberal dimensions even for grids of small power output. For a given transformer size the power output for the grid is therefore limited.

The subject of this invention is an arrangement of this type wherein the grid voltage is not taken directly from the saturated transformer, but from transformers which have normal magnetic saturation. An inductance with saturated core is used here only in the generation and control of grid voltage but it does not carry the grid load. Therefore, it is possible to use this arrangement of grid control for very high grid loads without an inductance with saturated core of exceptionally large dimensions.

Figure 1:
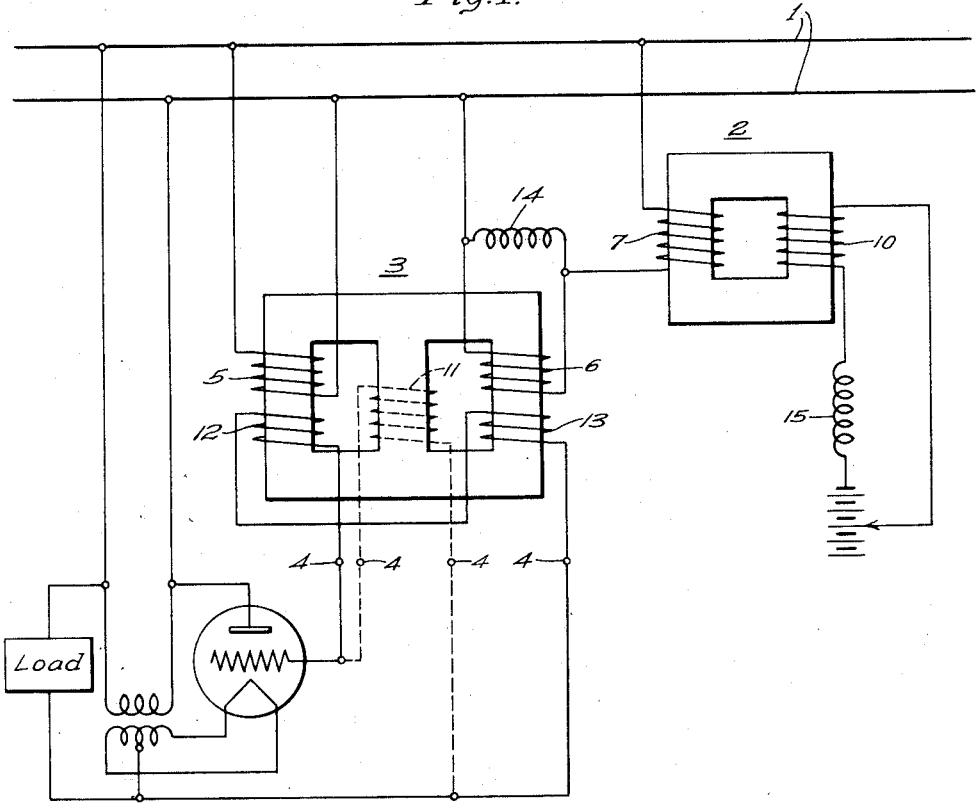
Figure 1:
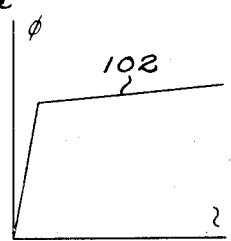
Figure 2:
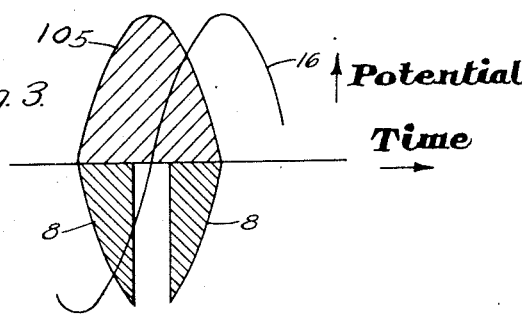
Figure 3:
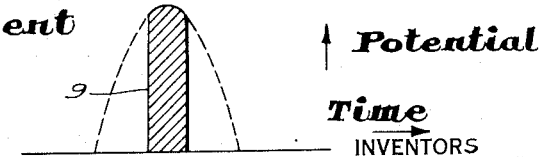
Figure 4:
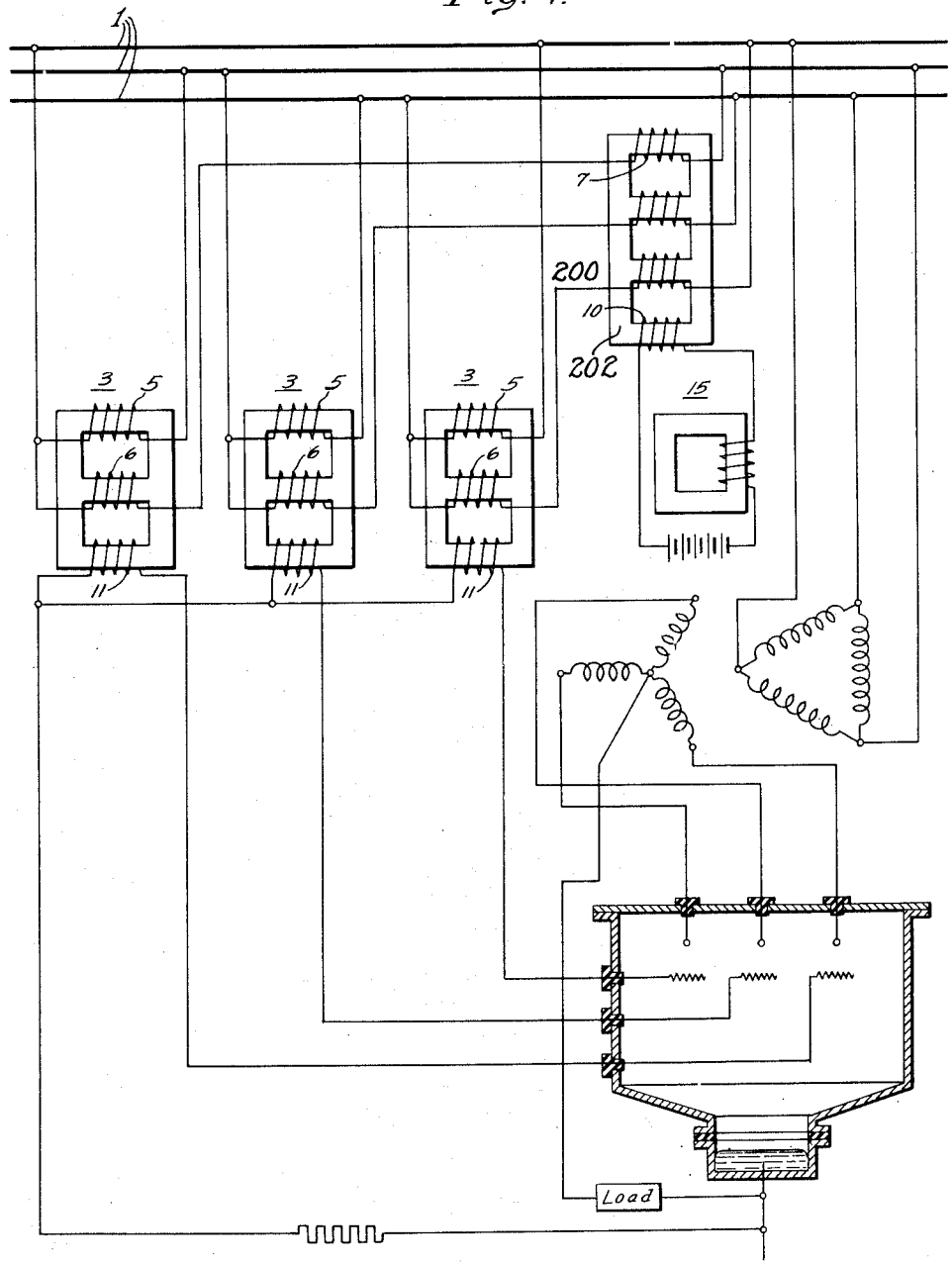

Figure 1 is a diagrammatic view showing a preferred embodiment of our invention, Fig. 2 is a graph showing the characteristic of a reactor used in the practice of our invention, Fig. 3 is a graph illustrating the operation of the arrangement shown in Fig. 1, and Fig. 4 is a diagrammatic view showing a polyphase system embodying our invention.

In Fig. 1 of the attached drawings 1 is the supply line for the grid circuit. 2 is the inductance (reactor) with saturated core. 3 is a three-cored nonsaturated transformer. 4 is the circuit of the grid of the arc like discharge device that is to be controlled.

The transformer 3 has two magnetization coils 5 and 6 with an equal number of turns, located on two of the cores and fed from the same line 1. By a proper connection of the coils 5 and 6 the middle core of the transformer may be maintained not magnetized. In series with one of these coils, for example, 6, we connect an inductance (reactor) 2. The line voltage will be divided in this circuit in proportion with the reactances of coil 6 and reactor 2. By a proper design of reactor 2, for example, by using a special alloy steel for the core, it is possible to obtain a magnetization curve 102 that is very steep at the beginning and subsequently, after a sharp break, continues with a practically negligible rise, as shown in Fig. 2.

The current in the circuit of coil 6 of transformer 3 and in coil 7 of reactor 2 is 90° behind the line voltage 1 in phase. In Fig. 3 the voltage and current curves in different parts of this arrangement are shown. It is considered, for the sake of simplification, that current in the circuit of coil 7 and reactor 2 which is represented by curve 16 has a sine wave form although if the line voltage has a sine form, the current curve 16 may differ considerably from that form. When the instantaneous value of the current is small, the reactance of coil 7 predominates in this circuit and the greatest part of the line voltage drop occurs between the terminals of the coil. When the instantaneous value of the current passes that point in the magnetization curve of reactor 2 where the break occurs, the reactor becomes saturated and its reactance drops to a low value. After that, the greatest part of the line voltage drop is impressed between the terminals of coil 6. The wave form voltage impressed on coil 6 is shown in curve 8, Fig. 3. The line voltage impressed on coil 5 is represented by curve 105. If a coil is wound on the middle core of transformer 3, or if two coils 12 and 13 having an equal number of turns and being connected so as to oppose each other, are assembled on two outside cores of the transformer, a voltage will be obtained at the terminals of coil 11 or at the outside terminals of coils 12 and 13 that will be proportional to the difference of the voltages of coils 5 and 6. This voltage is shown in Fig. 3 by curve 9 made up of the difference between the curves 8 and 105.

It is possible, by using this method, to obtain from transformer 3 voltage impulses of short duration which can be supplied to the grid. These impulses have remarkably steep increasing and decreasing boundaries.

If an additional coil 10 with direct-current excitation is wound on reactor 2, the saturation occurs for a different current through coil 7 than before, and as a result the peak of curve 9 is shifted in phase relative to the source potential. To each value of direct-current in coil 10 a definite phase position of voltage impulse 9 corresponds. By changing the value of direct-current excitation of the reactor 2, we can shift the moment of arc ignition.

When the grid load is supplied from the secondary winding 11 (or 12 and 13), a current impulse corresponding to the voltage impulse flows. At the beginning of the current impulse, the reactor 2 is not saturated and has a big reactance; therefore, the impedance of the circuit 6, 7 is much higher than the impedance of coil 5. As a result, the primary current corresponding to the secondary load is taken from the line mostly by the coil 5. In the limit when the reactance of reactor 2 is infinite, the winding 7 would have no current. We can have this effect still more pronounced by connecting in parallel to coil 6 a suitable impedance 14.

From what was said it is clear that the power furnished by the secondary winding of transformer 3 is taken from the line through winding 5. The circuit with saturated reactor 2 is used only for excitation and control of grid voltage. Therefore, a reactor of comparatively small dimensions will be sufficient here.

When a design is made in accordance with this invention, it is possible to achieve still other simplifications of schemes that were used before. For example, when a three-phase design is considered, the saturated reactors 2 are all combined in one three-phase reactor 200, with a fourth core 202 on which a coil 10 is assembled for common direct-current magnetization. Besides the simplication of the entire design, this arrangement has the advantage that the reactor 15 which is used in the direct-current circuit in order to prevent an alternating-current short in that circuit can be very small, because it is affected only by the higher harmonics of current (see curve 8). The three phase connection is shown in Fig. 4.

The same results can be obtained if the coil 10 is equally distributed over the cores of the reactor that carry coils. These parts of coil 10 are connected together in series. It was found that the most advantageous grid voltage wave form can be obtained for a design in accordance with this invention if the core of the reactor is made of so-called "Mumetall"—an alloy of 76% Ni, 17% Fe, 5% Cu, 2% Cr.

Where used in the following claims, the expression "a hypothetical unsaturated equivalent reactance" means a reactance which would have the same properties as applicants' reactance would have if the permeability of the magnetic circuit in the latter, instead of decreasing at the higher values of magnetizing force, remained constant at the value it now has at field strengths so low that magnetic saturation is substantially inappreciable.

We claim as our invention:

1. Apparatus for deriving, from a source of periodic current pulsations, impulses of short duration compared to a period of said source comprising a transformer having a magnetic core including a pair of end legs and a central leg, a main winding in one of said end legs connected directly across said source, an auxiliary winding on said other leg, said main and auxiliary windings being so related that by proper connection of said windings the central leg is unmagnetized and a secondary winding; a reactor that saturates for a value of current that is small compared to the instantaneous maximum value of the current flow from said source through a hypothetical unsaturated equivalent reactance, and means for connecting said reactor and said auxiliary winding in series across said source, said central leg being unmagnetized when said reactor is saturated.

2. Apparatus for deriving, from a source of periodic current pulsations, impulses of short duration compared to a period of said source comprising a transformer having a magnetic core including a pair of end legs and a central leg, a main winding in one of said end legs connected directly across said source, an auxiliary winding on said other leg, said main and auxiliary windings being so related that by proper connection of said windings the central leg is unmagnetized, and a secondary winding; a reactor that saturates for a value of current that is small compared to the instantaneous maximum value of the current flow from said source through a hypothetical unsaturated equivalent reactance but which when unsaturated has a reactance that is high compared to that of said main and auxiliary windings, and means for connecting said reactor and said auxiliary winding in series across said source, said central leg being unmagnetized when said reactor is saturated.

3. A control system for a discharge device having a control circuit that requires control current of such magnitude that with a transformer of moderate dimensions distortion of the wave form of the source of supply is introduced by the flow of the grid current under the influence of a potential having a distorted wave form, comprising a transformer of moderate dimensions having a main winding, an auxiliary winding and a secondary winding, a saturable reactor having a high impedance when unsaturated, means for connecting said auxiliary winding in series with said reactor across the source of supply, means for connecting main winding directly across said source and means for connecting said secondary winding in the control circuit of said discharge device, said main and auxiliary windings being so connected that the magnetizing flux of said transformer is linked with said secondary winding only when said reactor is unsaturated.

4. Apparatus for deriving, from a source of periodic current pulsations, impulses of short duration compared to a period of said source comprising a transformer having a magnetic core including a pair of end legs and a central leg, a main winding in one of said end legs connected directly across said source, an auxiliary winding on said other leg, said main and auxiliarly windings being so related that by proper connection of said windings the central leg is unmagnetized, and a secondary winding on said central leg; a reactor that saturates for a value of current that is small compared to the instantaneous maximum value of the current flow from said source through a hypothetical unsaturated equivalent reactance, and means for connecting said reactor and said auxiliary winding in series across said source, said central leg being unmagnetized when said reactor is saturated.

5. A device energized from a polyphase supply source for the generation of impulses of short duration comprising a transformer with at least three cores corresponding to each phase, each transformer having a plurality of magnetization coils, means for supplying one of said coils of each of said transformers directly from a corresponding phase of said source, a single polyphase saturable reactor having a winding corresponding to each phase of said source and means for supplying another of said coils of each of said transformers from the phase of said source from which the corresponding first mentioned coil is supplied through a winding of said reactor.

6. A device energized from a polyphase supply source for the generation of impulses of short duration comprising a transformer with at least three cores corresponding to each phase, each transformer having a plurality of magnetization coils, means for supplying one of said coils of each of said transformers directly from a corresponding phase of said source, a single polyphase saturable reactor having a winding corresponding to each phase of said source, means for supplying another of said coils of each of said transformers from the phase of said source from which the corresponding first mentioned coil is supplied through a winding of said reactor, said reactor having an auxiliary winding arranged in connection with the other windings in such manner that it is traversed only by the higher harmonics of the current flow through said reactor and means for supplying direct current to said auxiliary winding.

7. A device energized from a supply line for generation of voltage impulses of short duration using a transformer with two magnetization coils, a circuit of magnetic material linked by said coils and means to permit the flux induced in said circuit by current in one of said coils to bypass the portion of the circuit linked by said other coil, including a shunt-path of magnetic material, means for connecting one of said coils directly to said supply line and means for connecting the other coil to said supply line through a saturable reactance connected in series with said other coil.

8. In combination with a source of periodic pulsations, an electrical discharge device having a control electrode and a plurality of principal electrodes, said device having a control circuit, including said control electrode and one of said principal electrodes, which requires control current of relatively large magnitude whereupon if said control current is supplied through a hypothetical saturable transformer the magnetization current of said transformer must bear a large ratio to said control current and must be excessively high, means for preventing such high magnetization current comprising a transformer having two magnetization windings, a circuit of magnetic material linked by said windings and means to permit the flux induced in said circuit by one of said windings to bypass the portion of the circuit linked by said other winding, including a shunt-path of magnetic material, means for connecting one of said windings directly to said source, means for connecting the other of said windings to said source through a saturable reactance connected in series with said other winding, and a secondary winding linked with the magnetic flux traversing said shunt-path connected between said control electrode and said one of said principal electrodes.

BEDRICH HELLER.
JAROSLAV IBL.